UNITED STATES PATENT OFFICE.

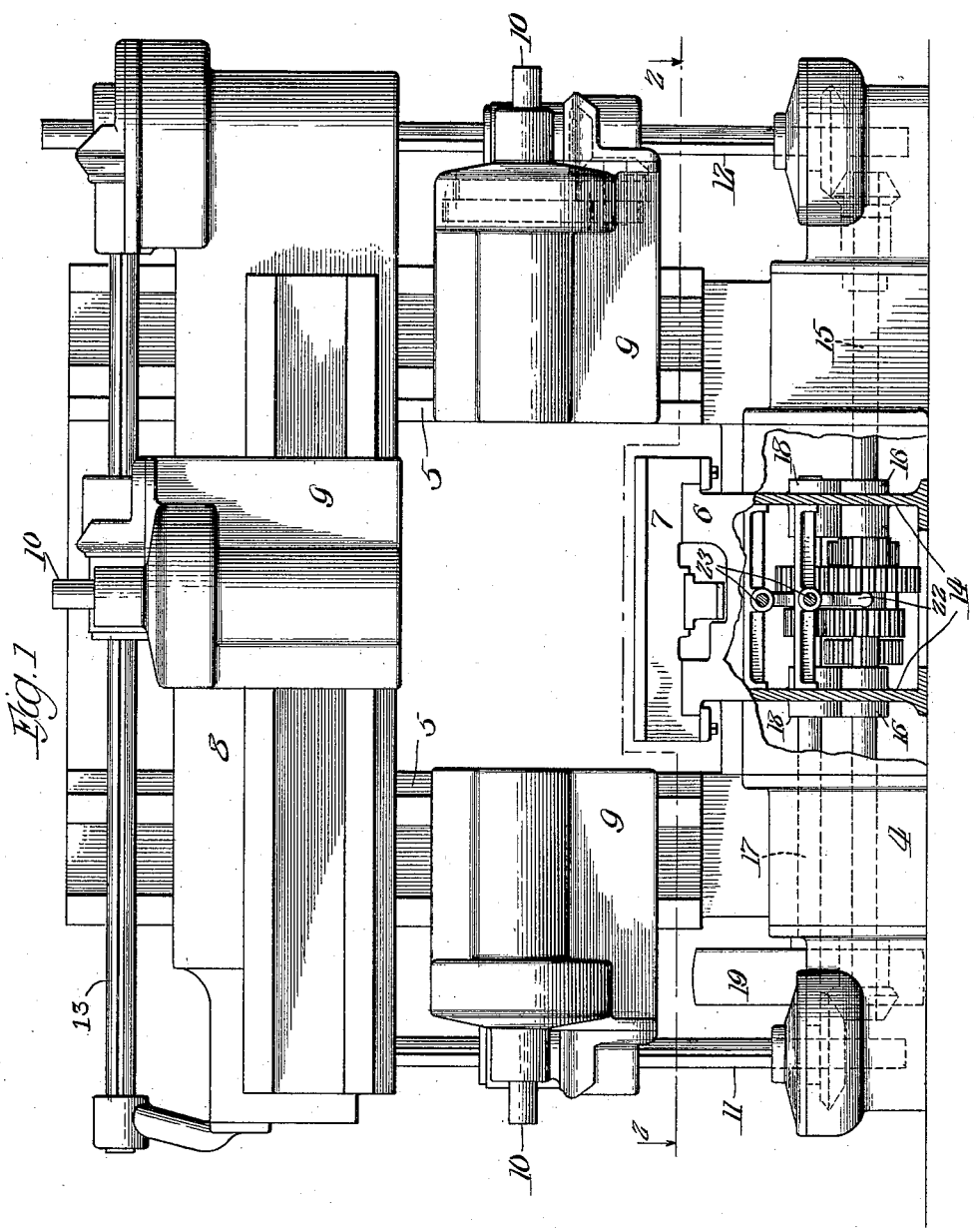

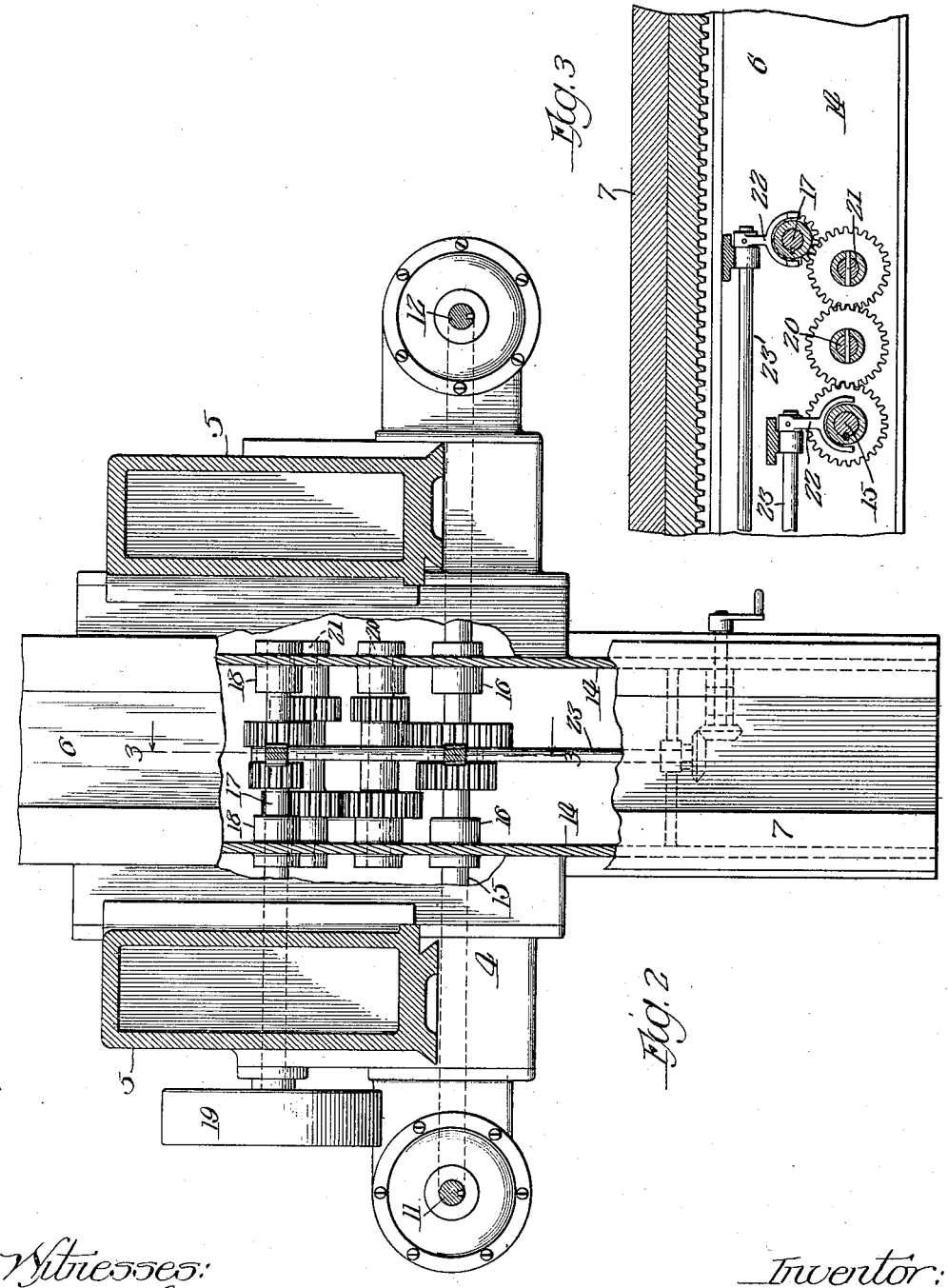

JOHN R. JOHNSON, OF ROCKFORD, ILLINOIS, ASSIGNOR TO INGERSOLL MILLING MACHINE COMPANY.

MILLING-MACHINE.

1,153,165.  Specification of Letters Patent.  Patented Sept. 7, 1915.

Application filed September 9, 1913.  Serial No. 788,798.

*To all whom it may concern:*

Be it known that I, JOHN R. JOHNSON, a citizen of the United States, residing at Rockford, in the county of Winnebago and State of Illinois, have invented certain new and useful Improvements in Milling-Machines, of which the following is a specification.

This invention relates to milling machines and more particularly to the drive of vertical spindle drive-shafts at opposite sides of a working bed.

One of the primary objects of my invention is to provide a novel means for driving a pair of vertical spindle drive-shafts in a milling machine of the planer type, whereby the shafts may be driven at variable speeds and the variable speed driving mechanism may be associated with the bed structure of the machine in a most practical and efficient manner.

Another object of this invention is to provide means for driving vertical spindle drive-shafts located at opposite sides of a work carrying bed with an equal driving force transmitted to said two shafts, and whereby the torsional resistance of said drive to the two shafts shall be proportionally equal.

In the accompanying drawings: Figure 1, is a face view of a milling machine embodying my invention, a portion of the body being broken away to show the driving transmission. Fig. 2, is a plan view as taken on the section line 2—2 of Fig. 1, and partly broken in section to show the drive transmission. Fig. 3, is a vertical sectional view taken on the line 3—3 of Fig. 2.

The milling machine illustrated in the drawings is of the type having vertical spindles and oppositely disposed horizontal spindles which are driven through a common source of drive, but which, as is well understood in the art, may be individually controlled as to drive and speed regulations from said common source of drive, and since the specific construction and operation of said spindles do not enter into the gist of my present invention I have deemed it unnecessary to illustrate and describe further than outline, the details of said spindle operations and construction.

The milling machine bed 4 supports two vertical side housings or columns 5 spaced apart, and interposed between said housings is a longitudinal bed 6 upon which is mounted slidable longitudinally, a work carrying table 7. A cross frame 8 is carried by the housings 5 above the table 7, and mounted movable longitudinally on a common side of said cross-frame and the housings are spindle heads 9 having rotatable cutter spindles 10 which are adapted to carry milling cutters (not shown) to operate upon work mounted upon the table 7. At each outer side of the machine and transversely oppositely disposed are mounted in the machine body vertical drive-shafts 11 and 12 in driving connection with the cutter spindles 10, the shaft 12 being in driving connection at its upper end with a cross spindle drive-shaft 13 which rotates the vertical cutter spindle 10.

The table bed 6 is formed with longitudinal side walls 14, and interposed between these side walls is located a gear transmission adapted to transmit variable speeds of drive to said vertical spindle drive-shafts 11 and 12. A transverse power-shaft 15 has its two ends in gear driving connection with the vertical shafts 11 and 12 and is journaled in bearings 16 in the bed walls 14 at its intersection of said walls. A main drive-shaft 17 disposed parallel with shaft 15, is journaled in bearings 18 in walls 14, and extends beyond one side of the body 4 carrying a pulley 19 which may be suitably driven. Two intermediate shafts 20 and 21 are mounted in journal bearings in the walls 14 intermediate the shafts 15 and 17. Variable sized gears are splined upon shafts 15 and 17 and are adapted to be moved into mesh with gears mounted upon shafts 20 and 21 to form a driving connection between said shafts 15 and 17, whereby the drive-speed of shaft 17 may be transmitted in various speeds to power-shaft 15. The slidable gears are moved axially by yoked arms 22 carried by rocker shafts 23 which may be rocked by suitable means to control the line of drive through the various gears.

In milling machines of the type above described it has heretofore been the practice to either drive one vertical spindle shaft and transmit the drive from the same to the opposite vertical shaft through a cross-drive, or to locate driving means adjacent one of said vertical drive-shafts and in driving connection with a cross connection driving with the two vertical shafts; and in these means of drive, since the opposite spindles driven by said shafts are of unequal distances to the source of power applied, their torsional resistances are unequal which result in unsatisfactory cutting by spindles. In my improved form of drive it will be noticed that the application of the power to the driving connection between the two vertical shafts is centrally between said shafts, thereby transmitting power to subtantially equal torsional resistance. Furthermore the table bed construction serves a double function, that of its designed function, (and since it is necessary for the bed to support heavy loads and resist great strains it is heavily and substantially built) and that of serving as a substantial mounting and casing for the transmission gearing which rigidly and effectively carries said gearing, protects the same by incasing it, and by isolating it gives added floor room and clearance at the outer edges of the machine body where it is now in common construction located.

While in the foregoing I have described a particular embodiment of my invention, it should be understood that I do not limit myself to the particular embodiment shown, since various changes may be made in the details of construction without departing from the scope of the invention as set forth in the appended claims or sacrificing any of its material advantages.

I claim as my invention.

1. In a milling machine of the planer type, the combination of spaced vertical side housings, a bed disposed intermediate the same, having spaced side walls and a top wall, a table slidably mounted on the top wall, a spindle saddle mounted on each side housing, a vertical shaft adjacent to each side housing and in driving connection with each spindle, a horizontal shaft extending transversely through the bed and being in driving connection at its ends with said vertical shafts, a gear transmission disposed within the bed and mounted in the side walls thereof, a driving connection between said transmission and the horizontal shaft intermediate the side walls, and means for driving said transmission from the outer side of the bed.

2. In a milling machine of the planer type, the combination of a bed having spaced vertical side walls and a top wall, a table slidably mounted upon the top wall, side housings at the outer sides of the side walls, spindle saddles carried by the side housings, a vertical spindle drive-shaft adjacent to each side housing, a horizontal shaft connecting the vertical shafts and extending through the side walls of the bed, a gear transmission mounted in the bed and being in driving connection with said horizontal shaft within the side walls of the bed, and means for driving said transmission from the outer side of the bed.

3. In a milling machine of the planer type, the combination of a longitudinal bed having spaced vertical side walls and a top wall joining the same, a table mounted to slide longitudinally on the top wall, a vertically extending side housing disposed at the outer side of each side wall, a spindle saddle mounted to slide vertically on each side housing, a vertical shaft disposed adjacent to each side housing at the outer side of the bed and being in driving connection with the adjacent spindle, a horizontal shaft extending transversely through the bed and being in direct driving connection at its ends with said vertical shafts, a horizontal drive shaft extending through one of the side walls of the bed and adapted to be driven from its outer end, and a variable speed gear transmission located within the walls of the bed and connecting the drive shaft with the first mentioned horizontal shaft whereby to transmit variable speed drive to the latter shaft at a point thereon within the walls of the bed.

In testimony whereof I have hereunto set my hand in presence of two subscribing witnesses.

JOHN R. JOHNSON.

Witnesses:
JOHN F. McCANNA, Jr.,
E. D. E. N. BEHEL.

Copies of this patent may be obtained for five cents each, by addressing the "Commissioner of Patents, Washington, D. C."